United States Patent
Yamada

(10) Patent No.: US 7,076,103 B2
(45) Date of Patent: Jul. 11, 2006

(54) METHOD, APPARATUS, AND PROGRAM FOR IMAGE DATA COMPRESSION

(75) Inventor: Masahiko Yamada, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 588 days.

(21) Appl. No.: 09/939,693

(22) Filed: Aug. 28, 2001

(65) Prior Publication Data
US 2002/0025076 A1 Feb. 28, 2002

(30) Foreign Application Priority Data
Aug. 28, 2000 (JP) ............................. 2000-257686

(51) Int. Cl.
*G06K 9/36* (2006.01)
(52) U.S. Cl. ...................... 382/232; 382/233
(58) Field of Classification Search ................ 382/232, 382/233, 235, 243; 386/33, 108, 109, 111, 386/112; 375/240.01, 240.08, 240.25; 358/425, 358/426.01; 348/412.1
See application file for complete search history.

(56) References Cited

U.S. PATENT DOCUMENTS

| | | | | |
|---|---|---|---|---|
| 5,517,246 A | * | 5/1996 | Suzuki | 348/412.1 |
| 5,841,935 A | * | 11/1998 | Asai et al. | 386/33 |
| 5,911,033 A | * | 6/1999 | Fujii et al. | 386/109 |
| 5,953,488 A | * | 9/1999 | Seto | 386/109 |
| 5,978,544 A | * | 11/1999 | Shimada et al. | 386/112 |
| 6,040,862 A | * | 3/2000 | Asai et al. | 375/240.12 |
| 6,549,995 B1 | * | 4/2003 | Schulz et al. | 711/202 |
| 6,577,813 B1 | * | 6/2003 | Ibaraki et al. | 386/111 |

* cited by examiner

*Primary Examiner*—Amir Alavi
(74) *Attorney, Agent, or Firm*—Sughrue Mion, PLLC

(57) ABSTRACT

When image data are compressed, a degree of image quality degradation can be recognized. At the time of compressing the image data, compression information is added as tag information in a file header of the image data. In this manner, by referring to the compression information, compression history of the compressed image data can be understood, and a degree of image quality degradation of the image data obtained by decompressing the compressed image data can be known.

19 Claims, 5 Drawing Sheets

FIG.3

| | | |
|---|---|---|
| COMPRESSION MODE 00 | · · · | LEVEL 0 (SUPER HIGH QUALITY) |
| COMPRESSION MODE 01 | · · · | LEVEL 1 (HIGH QUALITY) |
| COMPRESSION MODE 02 | · · · | LEVEL 2 (SEMI-HIGH QUALITY) |
| COMPRESSION MODE 03 | · · · | LEVEL 3 (STANDARD QUALITY) |
| COMPRESSION MODE 04 | · · · | LEVEL 4 (LOW QUALITY) |
| COMPRESSION MODE 01 TWICE | · · · | LEVEL 2 |
| COMPRESSION MODE 01 AND 02 | · · · | LEVEL 3 |
| COMPRESSION MODE 02 TWICE | · · · | LEVEL 4 |
| COMPRESSION MODE 03 TWICE | · · · | LEVEL 5 |
| COMPRESSION MODE 04 TWICE | · · · | LEVEL 5 |
| COMPRESSION MODE 02 AND 03 | · · · | LEVEL 5 |
| COMPRESSION MODE 01 AND 04 | · · · | LEVEL 5 |
| COMPRESSION MODE 02 AND 04 | · · · | LEVEL 5 |
| COMPRESSION MODE 03 AND 04 | · · · | LEVEL 5 |

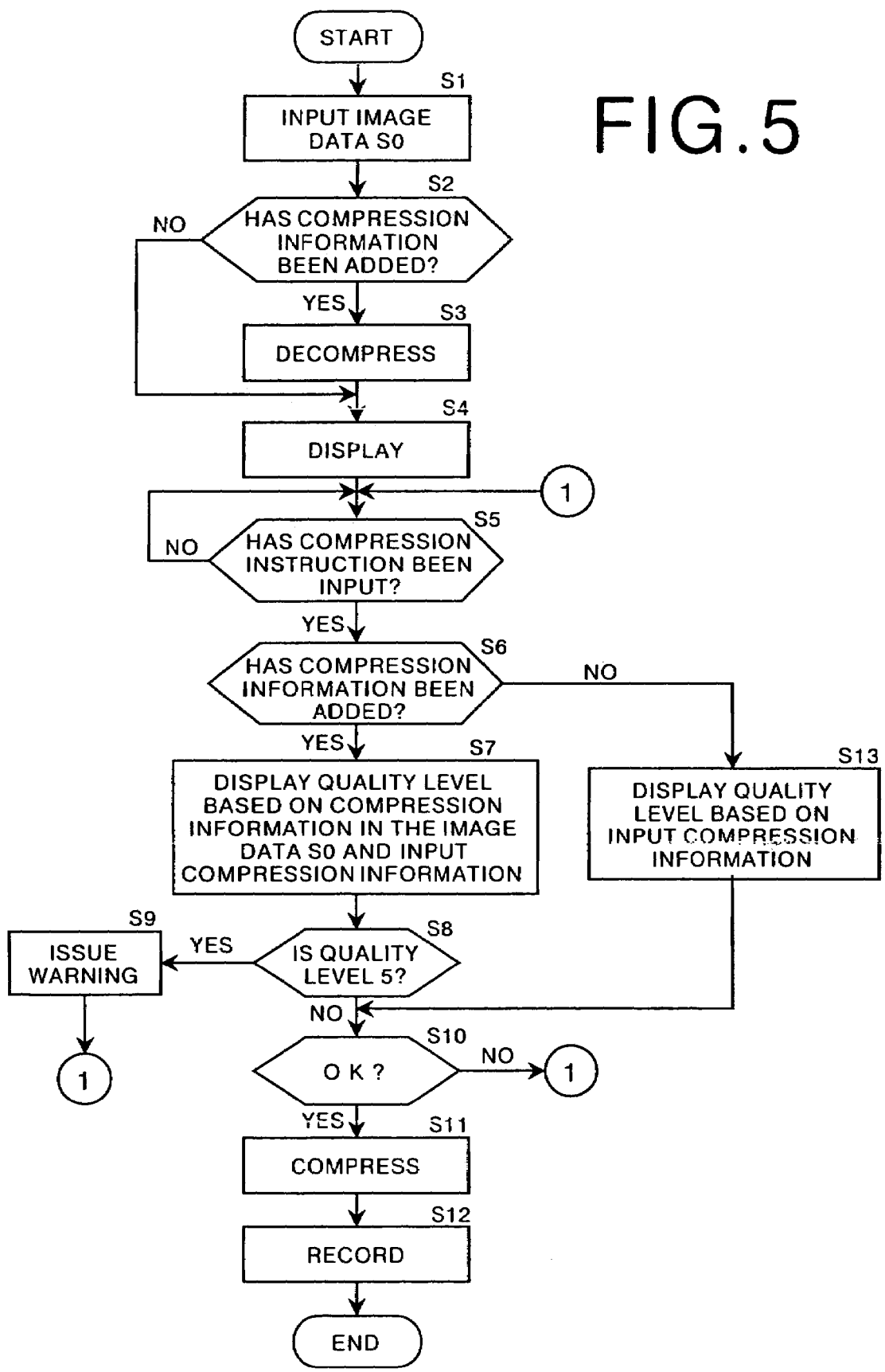

METHOD, APPARATUS, AND PROGRAM FOR IMAGE DATA COMPRESSION

BACKGROUND OF THE INVENTION

1. Field of the Invention

The present invention relates to a method and an apparatus for compressing image data, a method and an apparatus for decompressing image data that have been compressed, and an image display method and an image display apparatus for displaying decompressed image data. The present invention also relates to a program to cause a computer to execute the image data compression method, the image data decompression method and the image display method.

2. Description of the Related Art

A system for obtaining image data by reading a radiation image of a subject recorded on a stimulable phosphor sheet or on a film and for reproducing the image by using a display apparatus or the like after carrying out appropriate image processing thereon has been proposed. In such a system, image data obtained in the above manner are recorded in a recording medium such as an MO disc after being compressed to reduce an amount of data. As file formats for storing image data by compression, various formats such as JPEG, GIF and TIFF are used.

In the file formats for image data compression described above, two types of compression method, namely reversible compression and irreversible compression, have been defined. In reversible compression, original image data can be restored when image data compressed according this method are decompressed. In irreversible compression, some of information is lost in a process of compression, and original image data cannot be restored completely. In irreversible compression, the larger a compression ratio is, the more image quality degrades after decompression of compressed image data. Therefore, the compression ratio is set in consideration of image-quality degradation. Upon compression, compression information regarding compression processing such as the compression ratio and the compression format is described as tag information in a file header of compressed image data. The compressed image data can be decompressed with reference to this compression information.

After image data obtained by decompressing image data that have been compressed in the above manner are reproduced, irreversible compression is then carried out in some cases on the decompressed image data when the decompressed image data are stored. Since a portion of information of the original image data is lost in the irreversible compression, the quality of an image obtained by the compression degrades. Therefore, the image quality degrades repeatedly if the image data obtained by decompressing the irreversibly compressed image data are subjected to repetitive irreversible compression. Meanwhile, the compression information is added to the compressed image data. The compression information is overwritten upon compression in order to indicate the latest compression processing. Therefore, if the image data obtained by decompression of the image data having been subjected to repetitive irreversible compression are reversibly compressed in order not to degrade the image quality, the image quality becomes lower than that of an original image, regardless of the compression information indicating reversible compression. Therefore, the compression information contradicts the image quality. Especially, in the case of radiation image data, if a diagnosis is carried out on the assumption that an image used therefor has high quality, a serious misdiagnosis such as overlooking focus may occur in the case where the image is actually not high-quality.

SUMMARY OF THE INVENTION

The present invention has been conceived based on consideration of the above problem. An object of the present invention is therefore to provide an image data compression method and an image data compression apparatus enabling recognition of image quality degradation, an image data decompression method and an image data decompression apparatus for decompressing compressed image data, an image display method and an image display apparatus for displaying decompressed image data, and a program to cause a computer to execute the image data compression method, the image data decompression method, and the image display method.

An image data compression method of the present invention is a method of obtaining compressed image data to which compression information regarding compression processing is added upon compression of image data, and the image data compression method comprises the step of:

adding new compression information regarding new compression processing to the compression information in the case where the compression information has already been added to the image data.

The compression information refers to information indicating a compression format, a compression ratio, and reversible compression or irreversible compression.

It is preferable for the image data compression method of the present invention to further comprise the step of controlling a degree of compression of the image data based on the compression information when the image data having the compression information are compressed.

It is also preferable for the image data compression method of the present invention to further comprise the steps of:

receiving an input of the new compression information when the image data having the compression information are compressed; and judging, from the compression information already added to the image data and the newly added compression information, a degree of quality degradation of the image data after the compression that is going to be carried out; and issuing a warning in the case where the degree of quality degradation reaches a predetermined level or higher.

The degree of quality degradation reaches a higher level if the degradation becomes worse.

An image data decompression method of the present invention is a method of obtaining decompressed image data by decompressing the compressed image data obtained by using the image data compression method of the present invention, and the image data decompression method comprises the step of:

decompressing the compressed image data based on the compression information added to the compressed image data.

An image display method of the present invention is a method of displaying the decompressed image data obtained by using the image data decompression method of the present invention, and the image display method comprises the step of:

displaying the compression information together with an image represented by the decompressed image data.

An image data compression apparatus of the present invention is an apparatus for obtaining compressed image data to which compression information regarding compression processing is added upon compression of image data, and the image data compression apparatus comprises:

compression means for adding new compression information regarding new compression processing to the compression information in the case where the compression information has already been added to the image data.

In the image data compression apparatus of the present invention, it is preferable for the compression means to control a degree of compression of the image data based on the compression information when the image data having the compression information are compressed.

It is preferable for the image data compression apparatus of the present invention to further comprise input means for receiving an input of the new compression information when the image data having the compression information are compressed so that the compression means can judge a degree of quality degradation of the image data after the compression that is going to be carried out, based on the compression information already added to the image data and the newly added compression information. In the case where the quality degradation reaches a predetermined level or higher, the compression means issues a warning.

An image data decompression apparatus of the present invention is an apparatus for obtaining decompressed image data by decompressing the compressed image data obtained by the image data compression apparatus of the present invention, and the image data decompression apparatus comprises:

decompression means for decompressing the compressed image data based on the compression information added to the compressed image data.

An image display apparatus of the present invention is an apparatus for displaying the decompressed image data obtained by the image data decompression apparatus of the present invention, and the image display apparatus displays the compression information together with an image represented by the decompressed image data.

An image data compression decompression system of the present invention comprises the image data compression apparatus and the image data decompression apparatus of the present invention.

It is preferable for the image data compression decompression system of the present invention to further comprise the image display apparatus of the present invention.

The image data compression method, the image data decompression method, and the image display method may be provided as a program to cause a computer to execute the methods.

According to the image data compression method and the image data compression apparatus of the present invention, the new compression information is added in the case where the compression information has already been added to the image data to be compressed. Therefore, by referring to the compression information, a compression history of the image data can be recognized. In this manner, the degree of quality degradation of the image data obtained by decompressing the compressed image data can be recognized with reference to the compression information.

Furthermore, when the image data having the compression information are compressed, the degree of compression can be changed in order not to cause too much quality degradation of the decompressed image data obtained by decompression of the compressed image data, if the degree of the compression is controlled based on the compression information.

At this time, by receiving the input of the new compression information for compressing the image data and by issuing the warning based on the compression information already added to the image data and the newly added compression information in the case where the degree of quality degradation of the image data after the compression reaches the predetermined level or higher, an operator is informed of substantial image quality degradation which would be caused by the compression. As a result, the operator can change the compression ratio, for example.

According to the image display method and the image display apparatus of the present invention, the compression information is displayed when the decompressed image data are reproduced. Therefore, the compression history and the degree of quality degradation of the reproduced image can be recognized at a glance.

BRIEF DESCRIPTION OF THE DRAWINGS

FIG. 3 shows information regarding compression modes stored in a memory and image-quality levels;

FIG. 5 is a flow chart showing operation of this embodiment.

DESCRIPTION OF THE PREFERRED EMBODIMENT

Hereinafter, an embodiment of the present invention will be explained with reference to the accompanying drawings.

Figure 1:
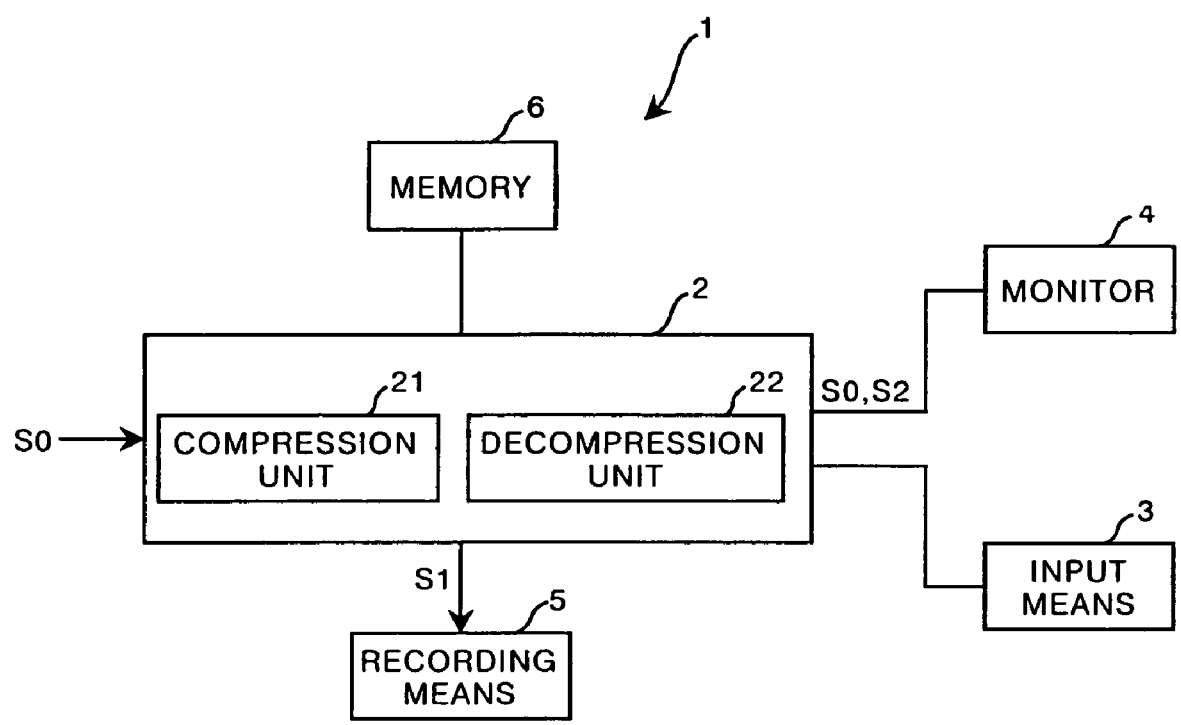
FIG. 1 is a block diagram showing a configuration of an image data compression decompression system as an embodiment of the present invention.

FIG. 1 is a block diagram showing a configuration of an image data compression decompression system comprising an image data compression apparatus and an image data decompression apparatus as the embodiment of the present invention. As shown in FIG. 1, an image data compression decompression system 1 in this embodiment comprises compression decompression means 2 having a compression unit 21 for obtaining compressed image data S1 by compressing image data S0 and a decompression unit 22 for obtaining decompressed image data S2 by decompressing compressed image data, input means 3 such as a keyboard and a mouse for carrying out various kinds of inputs to the compression decompression means 2, a monitor 4 for displaying the image data S0 and the like, recording means 5 such as an FD drive, an MO drive, and a CD-R drive for recording the compressed image data S1 in a recording medium such as an FD, an MO disc and a CD-R, and a memory 6 for storing information regarding a compression mode as will be explained later. The recording means 5 may be a hard disc.

The compression unit 21 compresses the image data S0 based on compression information such as a compression ratio and a compression format for the image data S0 input from the input means 3, and obtains the compressed image data S1. At the same time, the compression unit 21 adds the compression information as tag information in a file header of the image data S1. In the case where the image data S0 have already been subjected to compression processing, the compression information input from the input means 3 is added to the compression information that has already been added to the image data S0.

Figure 2A:
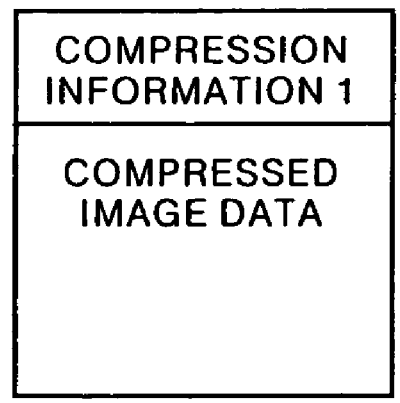
FIGS. 2A to 2C show compressed image data.
Figure 2B:
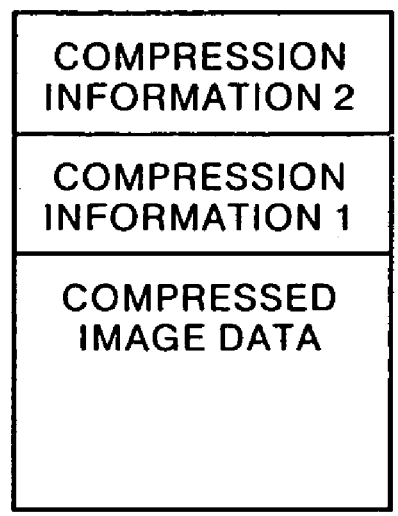
Figure 2C:
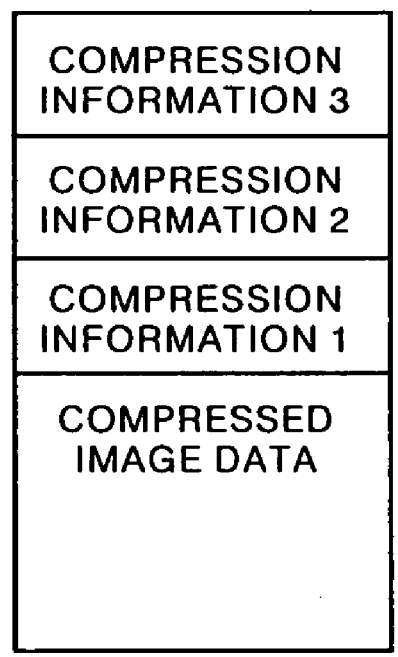

For example, in the case where the compression information has not been added to the image data S0, compression information 1 is added to the compressed image data S1 at the time of compressing the image data S0, as shown in FIG. 2(a). Meanwhile, in the case where the compression information 1 has already been added to the image data S0, compression information 2 is added to the compressed image data S1 at the time of compressing the image data S0. In the case where the compression information 1 and 2 has already been added to the image data S0, compression information 3 is added to the image data S1 at the time of compressing the image data S0. Therefore, the compressed image data S1 includes a history of all compression processing carried out to generate the compressed image data S1.

The decompression unit 22 decompresses the image data S0 based on the compression information added to the image data S0 in the case where the image data S0 have already been compressed, and obtains the decompressed image data S2.

In the case where the image data S0 have not been compressed, the image data S0 are displayed as they are on the monitor 4. Meanwhile, in the case where the image data S0 have been compressed, the image data S0 are decompressed and the decompressed image data S2 are displayed on the monitor 4. It is preferable for the compression information added to the image data S0 to be displayed on the monitor 4 together with the decompressed image data S2, in the case where the image data S0 have been subjected to compression.

The memory 6 stores information indicating a relationship between a compression mode corresponding to the compression ratio and a level of image quality. An example of this information is shown in FIG. 3. In FIG. 3, a compression mode "00" refers to reversible compression. Compression modes "01", "02", "03", and "04" refer to irreversible compression having compression ratios 1/5, 1/10, 1/20, and 1/40, respectively. The level of image quality is shown by 0 to 5 meaning super-high quality, high quality, semi-high quality, standard quality, low quality and extremely low quality not suitable for actual use (super-low quality), respectively in this order.

When the decompressed image data S2 obtained by decompressing the image data S0 having the compression information are displayed on the monitor 4, it is preferable for the level of image quality to be displayed on the monitor 4, based on the compression information added to the image data S0 and the information stored in the memory 6.

Figure 4:
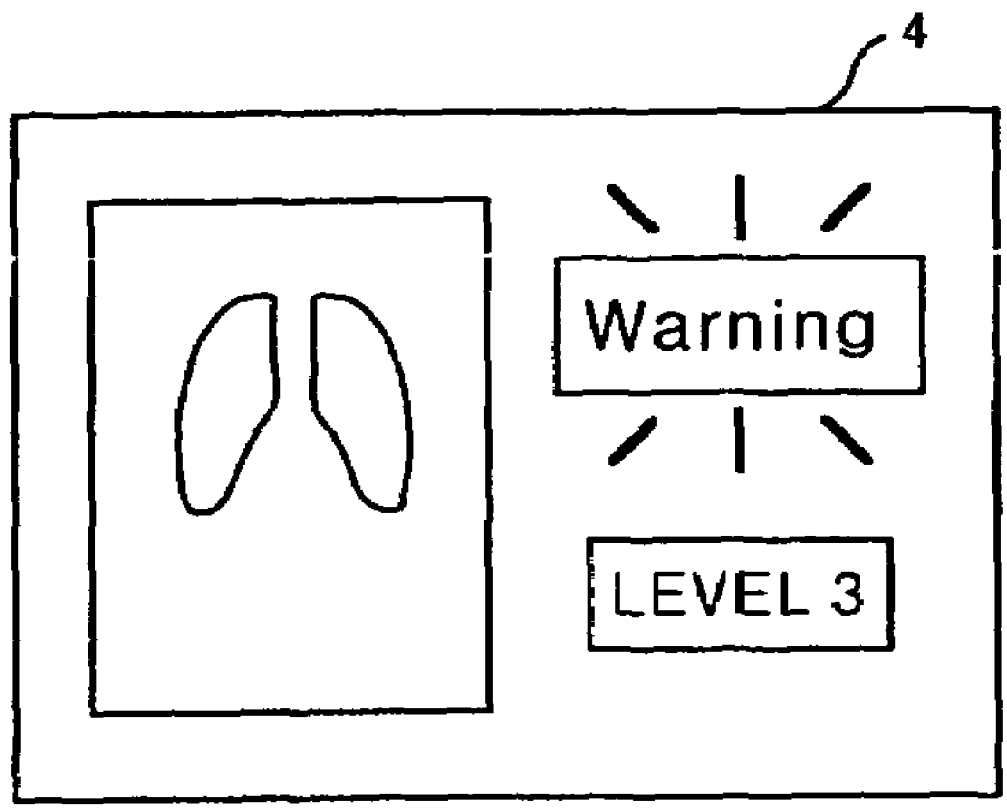
FIG. 4 shows an image, a quality level, and a warning displayed together on a monitor.

As shown in FIG. 4, at the time of compressing the image data S0, the compression unit 21 displays on the monitor 4 the level of image quality of the image data obtained by decompressing the compressed image data together with an image represented by the image data S0 based on the compression information input from the input means 3, while referring to the information stored in the memory 6. In the case where the image data S0 have been subjected to compression, the level of image quality is displayed on the monitor 4 based on the compression information added to the image data S0 and the compression information that has been input (see FIG. 4).

In the case where the level of image quality becomes level 5 based on both the compression information added to the image data S0 and the input compression information, the quality of an image to be obtained becomes extremely low if the image data S0 are compressed according to the compression ratio based on the input compression information. Therefore, in this case, it is preferable for a warning to be displayed on the monitor 4, such as "Warning" shown in FIG. 4, so that compression according to the compression ratio is not carried out. The warning may be a sound or the like.

Operation of this embodiment will be explained next. FIG. 5 is a flow chart showing the operation of this embodiment. The image data S0 are input to the compression decompression means 2 (Step S1). The compression decompression means 2 judges whether or not the compression information has been added to the file header of the image data S0 (Step S2). In the case where the compression information has been added to the image data S0, the image data S0 are decompressed by the decompression unit 22 (Step S3), and the decompressed image data S2 are displayed on the monitor 4 (Step S4). In the case where the compression information has not been added, the image data S0 are displayed as they are on the monitor 4 (Step S4).

When a compression instruction including the compression information is input from the input means 3 (Step S5), the image data S0 are compressed based on the compression information that has been input. At this time, whether or not the compression a information has already been added to the image data S0 is judged (Step S6). In the case where the compression information has already been added, the level of image quality is displayed on the monitor 4 according to the information stored in the memory 6, based on the compression information that has been added to the image data S0 and the compression information input from the input means 3 (Step S7). For example, if the compression mode in the compression information added to the image data S0 is "01" and the compression mode in the compression information input from the input means 3 is "02", "Level 3" is displayed on the monitor 4.

Whether or not the level of image quality is level 5 indicating super-low quality is then judged (Step S8). In the case where a result at Step S8 is affirmative, the warning is displayed on the monitor 4 (Step S9), and the procedure returns to Step S5. The procedure from Step S5 is then repeated after another compression instruction is input.

In the case where the result at Step S8 is negative, whether or not an affirmation of the level of image quality has been input from the input means 3 is judged (Step S10). In the case where the affirmation of the level has been input, the image data S0 are compressed (Step S11). The compressed image data S1 are recorded in a recording medium such as an FD or an MD by the recording means 5 (Step S12) to end the procedure. In the case where the result at Step S10 is negative, the procedure returns to Step S5. Another compression instruction is prompted and the procedure from Step S5 is repeated.

Meanwhile, in the case where the compression information has not been added to the image data S0, the compression unit 21 displays the level of image quality on the monitor 4 based on the compression information input from the input means 3, while referring to the information stored in the memory 6 (Step S13). The processing from Step S10 to Step S12 is then carried out to record the compressed image data S1 in the recording medium.

According to this embodiment, in the case where the compression information has already been added to the image data S0, the newly input compression information is added to the existing compression information, as has been described above. Therefore, by referring to the compression information added to the compressed image data S1, the compression history of the image data S1 can be recognized. As a result, a degree of image quality degradation of the decompressed image data S2 obtained by decompressing the compressed image data S1 can be recognized.

In the case where the image data S0 have already been subjected to compression, the level of image quality is displayed on the monitor 4, based on the compression information added to the image data S0 and the compression information input from the input means 3. Therefore, the degree of image quality degradation of the decompressed image data S2 obtained by decompressing the compressed image data can be recognized. Consequently, a degree of compression can be changed in order not to cause too much quality degradation of the decompressed image data.

At this time, in the case where the level of image quality becomes level 5, the warning is issued. As a result, substantial degradation of image quality caused by compression can be prevented.

In the above embodiment, the image data compression decompression system adopts the image data compression apparatus and the image data decompression apparatus of the present invention. However, each of the apparatus may be used in a stand-alone manner.

What is claimed is:

1. An image compression method for obtaining compressed image data to which compression information regarding compression processing is added upon compression of image data, the image data compression method comprising the step of:
    adding new compression information regarding new compression processing to the compression information already added to the image data.

2. An image data compression method as defined in claim 1, further comprising the step of:
    controlling the degree of compression of the image data based on the compression information already added to the image data when the image data is compressed.

3. An image data compression method as defined in claim 2, further comprising the steps of:
    receiving an input of the new compression information when the image data is compressed; and
    judging, from the compression information already added to the image data and the new compression information, a degree of quality degradation of the image data after the compression; and
    issuing a warning in the case where the degree of quality degradation reaches a predetermined level or higher.

4. An image data decompression method for obtaining decompressed image data by decompressing the compressed image data obtained by using the image data compression method defined in any one of claims 1 to 3, the image data decompression method comprising the step of:
    decompressing the compressed image data based on the compression information added to the compressed image data.

5. An image display method for displaying the decompressing image data obtained by using the image data decompression method defined in claim 4, decompressing the compressed image data based on the compression information added to the compressed image data, the image display method comprising the step of:
    displaying the compression information together with an image represented by the decompressed image data.

6. An image data compression apparatus for obtaining compressed image data to which compression information regarding compression processing is added upon compression of image data, the image data compression method comprising the step of:
    a compression means for adding new compression information regarding new compression processing to the compression information already added to the image data.

7. An image data compression apparatus as defined in claim 6, wherein the compression means controls a degree of compression of the image data based on the compression information already added to the image data when the image data is compressed.

8. An image data compression apparatus for obtaining decompressed image data by decompressing the compressed image data obtained by the image data compression apparatus defined in claim 7, the image data decompression apparatus comprising:
    decompression means for decompressing the compressed image data, based on the compression information added to the compressed image data.

9. An image data compression apparatus as defined in claim 6, further comprising the steps of:
    input means for receiving an input of the new compression information when the image data is compressed, wherein
    the compression means judges, from the compression information already added to the image data and the new compression information, a degree of quality degradation of the image data after the compression and issues a warning in the case where the quality degradation reaches a predetermined level or higher.

10. An image data compression apparatus for obtaining decompressed image data by decompressing the compressed image data obtained by the image data compression apparatus defined in claim 8, the image data decompression apparatus comprising:
    decompression means for decompressing the compressed image data, based on the compression information added to the compressed image data.

11. An image data compression apparatus for obtaining decompressed image data by decompressing the compressed image data obtained by the image data compression apparatus defined in claim 6, the image data decompression apparatus comprising:
    decompression means for decompressing the compressed image data, based on the compression information added to the compressed image data.

12. An image display apparatus for displaying the decompressed image data obtained by the image data decompression apparatus defined in any one of claims 9 to 10, the image display apparatus displaying the compression information together with an image represented by the decompressed image data.

13. An image data compression decompression system comprising the image data compression apparatus defined in any one of claims 6 to 8 and
    a decompression apparatus in which a decompression means decompresses the compressed image data, based on the compression information added to the compressed image data.

14. An image data compression decompression system as defined in claim 13, further comprising an image display apparatus displaying the compression information together with an image represented by the decompressed image data.

15. A computer-readable program means causing a computer to execute an image data compression method for obtaining compressed image data to which compression information regarding compression processing is added upon compression of image data, the program means comprising:

computer readable program means for adding compression information to image data; and computer readable program means for adding new compression information regarding new compression processing to the compression information in the case where the compression information has already been added to the image data.

16. The computer-readable program means as defined in claim 15, further comprising:

computer-readable program means for controlling a degree of the compression of the image data based on the compression information already added to the image data when the image data having the compression information are compressed.

17. The computer-readable program means as defined in claim 16, further comprising:

computer-readable program means for receiving an input of the new compression information when the image data having the compression information are compressed; and judging, from the compression information already added to the image data and the newly added compression information, a degree of quality degradation of the image data after the compression; and computer readable program means for issuing a warning in the case where the degree of quality degradation reaches a predetermined level or higher.

18. The computer readable program means of one of claims 15–17 further comprising:

a computer-readable program means for decompressing the compressed image data based on the compression information added to the compressed image data.

19. A computer readable program means of claim 18, further comprising:

computer-readable program means displaying the compression information together with an image represented by the decompressed image data.

* * * * *